United States Patent [19]
Leichil

[11] 3,762,646
[45] Oct. 2, 1973

[54] NOZZLE CLIPS
[75] Inventor: Ludwig Leichil, Emmanus, Pa.
[73] Assignee: McCord Corporation, Detroit, Mich.
[22] Filed: Dec. 23, 1971
[21] Appl. No.: 211,228

[52] U.S. Cl. .............................. 239/284, 248/74 R
[51] Int. Cl. .............................................. B05b 1/10
[58] Field of Search ................... 239/282, 283, 284; 81/9.3; 248/65, 74, 75 R

[56] References Cited
UNITED STATES PATENTS
| | | | |
|---|---|---|---|
| 3,300,143 | 1/1967 | Lawson | 239/284 |
| 3,471,110 | 10/1969 | Mack | 248/74 R |
| 2,105,676 | 1/1938 | Stow | 239/284 |
| 2,961,168 | 11/1960 | Webb | 239/284 |
| 3,173,613 | 3/1965 | Smith | 239/284 |
| 3,266,735 | 8/1966 | Webb | 239/284 |

Primary Examiner—M. Henson Wood, Jr.
Assistant Examiner—Michael Mar
Attorney—Gerald E. McGlynn, Jr. et al.

[57] ABSTRACT

This invention relates to nozzle clips used in windshield washing systems for supporting the fluid carrying conduit. The conduit has an irregularity around which is wrapped a portion of a support bracket to prevent linear and rotary motion of the conduit during fabrication and service.

3 Claims, 10 Drawing Figures

PATENTED OCT 2 1973 3,762,646

INVENTOR.
Ludwig Leichtl
BY
McGlynn, Reising, Milton & Ethington
ATTORNEYS

INVENTOR.
Ludwig Leichtl
BY
McGlynn, Reising, Milton & Ethington
ATTORNEYS

NOZZLE CLIPS

This invention relates to a nozzle clip assembly of the type used in automotive windshield washer systems.

Various types of brackets have been used in the past for the purpose of holding and supporting a conduit for carrying the windshield washing fluid. The patents to Webb U.S. Pat. Nos. 2,961,168; 3,226,735 and 3,286,931 each disclose a windshield washer system that includes a nozzle device for directing a spray of washing fluid onto the windshield. Each of these nozzle devices includes a bracket for supporting a conduit on or within the cowling of an automobile. In these assemblies there is included a conduit having a bend between the straight sections. The bracket to support this conduit generally includes two wrap portions which are wrapped around the straight sections of the conduit at positions spaced from the bend in the conduit. The brackets include a planar section with a bend therein corresponding to the bend in the conduit and the wrap portions extend laterally from one side of the bracket. These assemblies present an assembly problem in that it is very difficult to sequentially wrap the wrap portions of the bracket about the conduit while maintaining the two properly oriented with respect to one another so that the nozzle at the end of the conduit will be pointed properly when the bracket is attached to the automobile. Also in some of these assemblies, such as that shown in U.S. Pat. No. 2,961,168, the bracket is not in sufficient engagement with the conduit to prevent movement of the conduit relative to the bracket while in service.

The patent to Lawson; U.S. Pat. No. 3,300,143; discloses a nozzle for a windshield clearing system that includes means for supporting the conduit of the system on the cowling of the automobile forward of the windshield. In this system the means includes an extremely curved portion that defines a loop for receiving a screw and washer that is in turn attached to the cowling of the automobile for holding the conduit in place. This method is not very practical since it is very difficult to align the nozzle during the initial assembly operation and furthermore the nozzle may move out of alignment if the screw becomes loosened during service. The greatest drawback is in the complexity of the bend in the conduit which makes the bend very difficult to form.

Other types of brackets and various methods have been used for the purpose of supporting the nozzle and conduit in windshield washing systems. Another method is to solder the conduit onto a bracket and attach the bracket to the automobile. This method also presents a number of drawbacks. Whenever a soldering operation is required the kinds of material available for manufacturing the bracket and conduit are limited. During the soldering operation the bracket and conduit must be aligned perfectly so that the nozzle at the end of the conduit will be pointed properly when the assembly is attached to the automobile. Any angular or linear motion of the conduit relative to the bracket will cause misalignment of the windshield washer spray and adversely affect the operation of the windshield washing system.

It is therefore an object and feature of the instant invention to provide a nozzle clip assembly for windshield washing systems that is fabricated by a method that will inherently preclude linear and angular motion of its various components to insure positive alignment when included in a windshield washing system.

It is yet another object and feature of the instant invention to provide a method of manufacturing a nozzle clip assembly that allows the greatest freedom in the selection of materials.

While another object and feature of the instant invention is to provide a method of manufacturing a nozzle clip assembly that is simple and economical to produce in light of previous methods of manufacture.

In correlation with the foregoing objects and features, it is another object and feature of this invention to provide a nozzle clip assembly including a conduit means defining a nozzle and having an offset irregularity therein and support means in mechanical interlocking engagement with the irregularity for preventing linear and angular motion therebetween and for supporting the conduit on a support structure to overcome the problems associated with the prior art assemblies.

Other objects and advantages of the instant invention will be readily appreciated as the same becomes better understood by references to the following detailed description when considered in connection with the accompanying drawings wherein.

Referring now to the drawings, wherein like numerals indicate like or corresponding parts throughout the several views, a nozzle clip assembly constructed in accordance with the instant invention is generally shown at 10.

The nozzle clip assembly 10 is mounted on the cowling 12 of an automobile 14 to direct a spray of windshield washing fluid onto the windshield 16.

Figure 1:
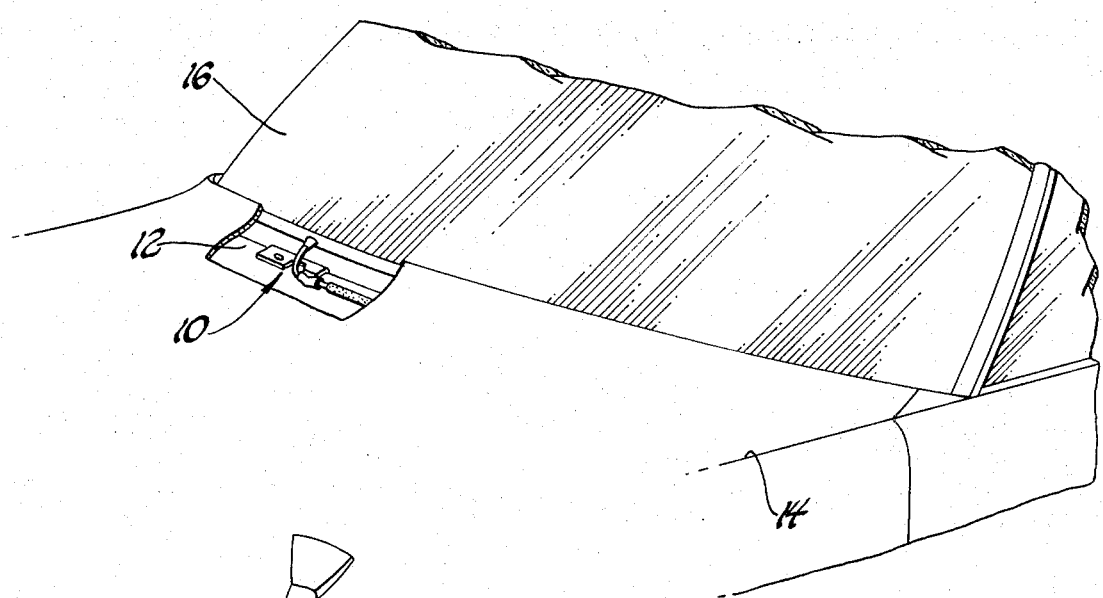
FIG. 1 is a fragmentary partially cut away view of an automobile including a preferred embodiment of the instant invention.
Figure 2:
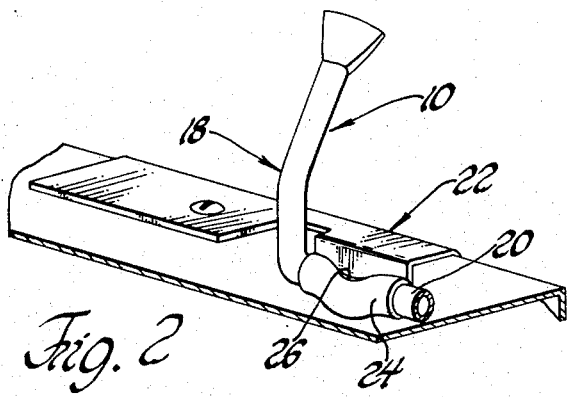
FIG. 2 is an enlarged perspective view of a preferred embodiment of the instant invention as shown in FIG. 1.
Figure 4:
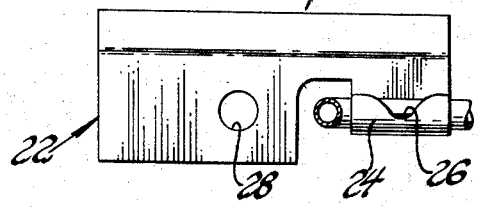
FIG. 4 is a cross-sectional view taken generally along line 4—4 of FIG. 3.
Figure 3:
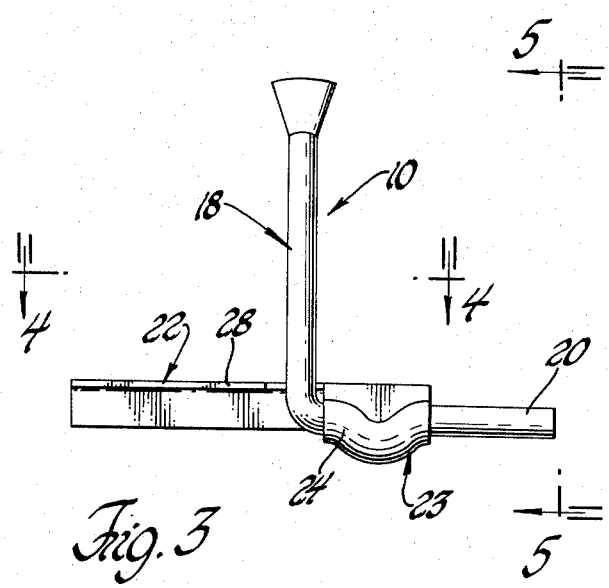
FIG. 3 is an elevation view of a preferred embodiment of the instant invention.
Figure 5:
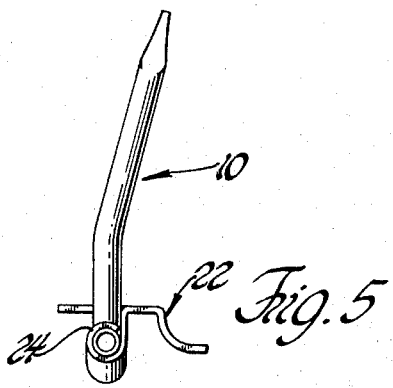
FIG. 5 is a side view taken generally along line 5—5 of FIG. 3.
Figure 6:
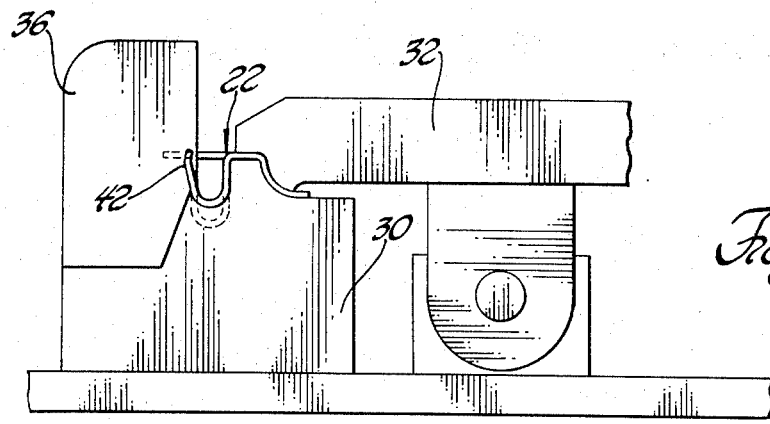
FIG. 6 is an elevational view of forming die assembly in a configuration with the bracket of the preferred embodiment of the instant invention clamped therein.
Figure 7:
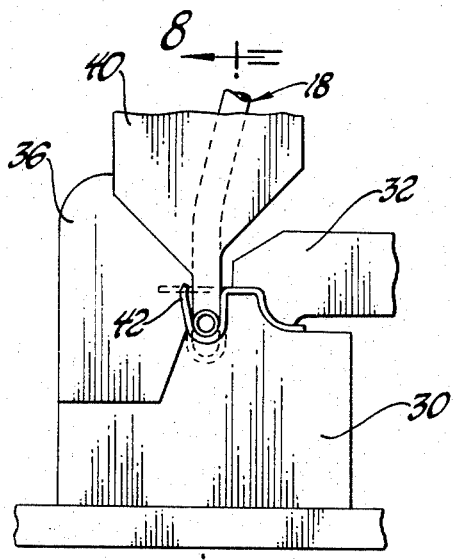
FIG. 7 is a plan view of the forming die assembly in another configuration with the bracket and nozzle conduit of the preferred embodiment of the instant invention clamped therein.
Figure 8:
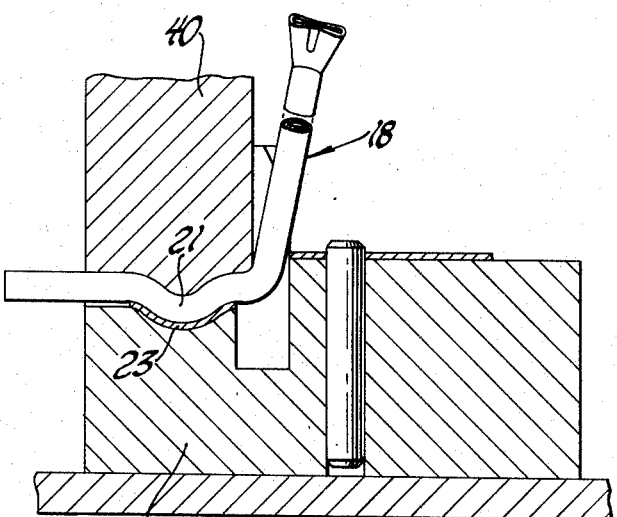
FIG. 8 is a cross-sectional view taken generally along line 8—8 of FIG. 7.
Figure 9:
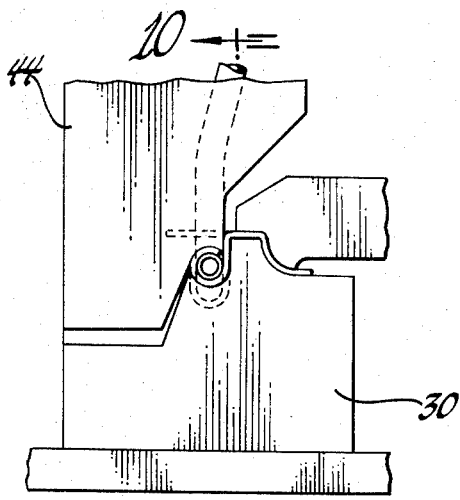
FIG. 9 is an elevation view of the forming assembly in yet another configuration with the bracket and nozzle conduit of the preferred embodiment of the instant invention disposed therein.
Figure 10:
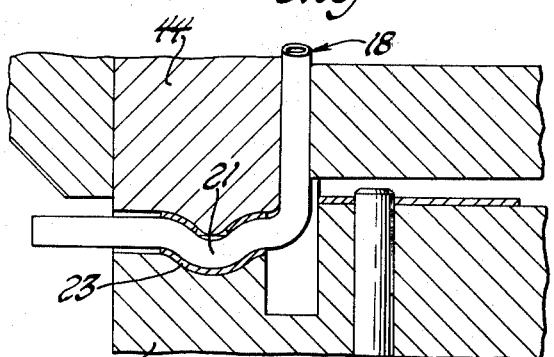
FIG. 10 is a cross-sectional view taken generally along line 10—10 of FIG. 9.

The nozzle clip assembly 10 includes a conduit generally indicated at 18 for carrying the windshield washing fluid. he conduit includes a straight section 20 having an axis, and along the straight section 20 is an offset irregularity 21 as best shown in FIGS. 8 and 10. More specifically, the irregularity is offset from the axis of the straight section 20 which extends from the opposite extremities of the irregularity.

The nozzle clip assembly 10 includes support means or bracket generally indicated at 22 for supporting the conduit 18. The support means 22 includes a preformed saddle-like area 23 for receiving the offset portion 21 of the conduit 18. A section 24 of the support means 22 is wrapped around the conduit 18 to encompass at least a portion of the irregularity 21. The offset portion 21 of the conduit 18 seats in the saddle-like portion 23 of the support means 22 thereby preventing linear and angular motion therebetween. The offset portion of the conduit 18 is shown to be arcuately shaped but can take on any shape that will restrict relative motion between the support means and the conduit.

The wrapped around portion 24 of the support means 22 includes a relieved area 26. The relieved area 26 is provided in the saddle-like portion of the support means 22 to prevent the accumulation of material of the support means 22 when it is wrapped around the conduit 18. The relieved area 26 is adjacent the inside radial surface of the arcuate portion of the conduit 18. In other words, the relieved area is disposed adjacent the smallest radius of the arcuate portion defined by the offset portion in the conduit 18. Said yet another way, the relieved area is on the inside surface of the irregularity closest to the axis of the straight section 20.

The support means 22 includes means comprising a hole 28 for receiving a suitable fastener 30 whereby the support means 22 may be secured to the cowling 12 of the automobile 14.

The method of manufacturing the nozzle clip assembly of the instant invention includes clamping the support means 22 in a nest of a die 30. This is accomplished by bringing a spring loaded clamp 32 into engagement with the support means 22 while so supported. The straight portion of the conduit 18 is placed in the saddle-like portion 23 of the support means 22 after the support means 22 is clamped in the nest of the die 30. A form 40 engages the two components of the nozzle clip assembly 10 to form and force the irregularity 21 of the conduit 18 into contiguous contact with the saddle portion 23 of the support means 22. This procedure brings the conduit 18 into proper alignment with the support means 22 whereby the conduit will properly direct the flow of windshield washing fluid when it is disposed in the windshield washing system by being attached to an automobile. The free end 32 of the saddle portion 23 of the support means 22 is wrapped around a portion of the irregularity of the conduit 18 by means of a crimp punch 44 to form a permanent union therebetween.

By the above method the two components of a nozzle clip assembly 10 are brought into contiguous contact and a solderless union is formed by the steps described above.

The invention and method of manufacturing the same have been described in an illustrative manner and it is to be understood that the terminology which has been used is intended to be in the nature of words of description rather than limitation.

Obviously many modifications and variations in the present invention are possible in light of the above teachings. It is therefore to be understood that within the scope of the invented claims the invention may be practiced otherwise than as specifically described.

The embodiments of the instant invention and method of manufacturing the same in which an exclusive property or privilege is claimed are defined as follows:

1. A nozzle clip assembly for windshield washing systems comprising; conduit means defining a nozzle and having an offset irregularity therein and support means in mechanical interlocking engagement with said irregularity for preventing linear and angular motion therebetween and for supporting said conduit on a support structure, said conduit means including a straight section having an axis, said offset irregularity being offset from said axis, said straight section extending from opposite extremities of said offset irregularity, said support means including a section wrapped around said conduit to encompass at least a portion of said irregularity, said section of said support means wrapped around said conduit including a relieved area adjacent the inside surface of said irregularity closest to said axis whereby accumulation of the material of said portion does not occur.

2. A nozzle clip assembly as set forth in claim 1 wherein said offset portion of said irregularity is arcuate.

3. A nozzle clip assembly as set forth in claim 1 wherein said support means includes a hole for receiving a suitable fastener whereby said support means may be secured to a support structure.

* * * * *